United States Patent Office 2,952,032
Patented Sept. 13, 1960

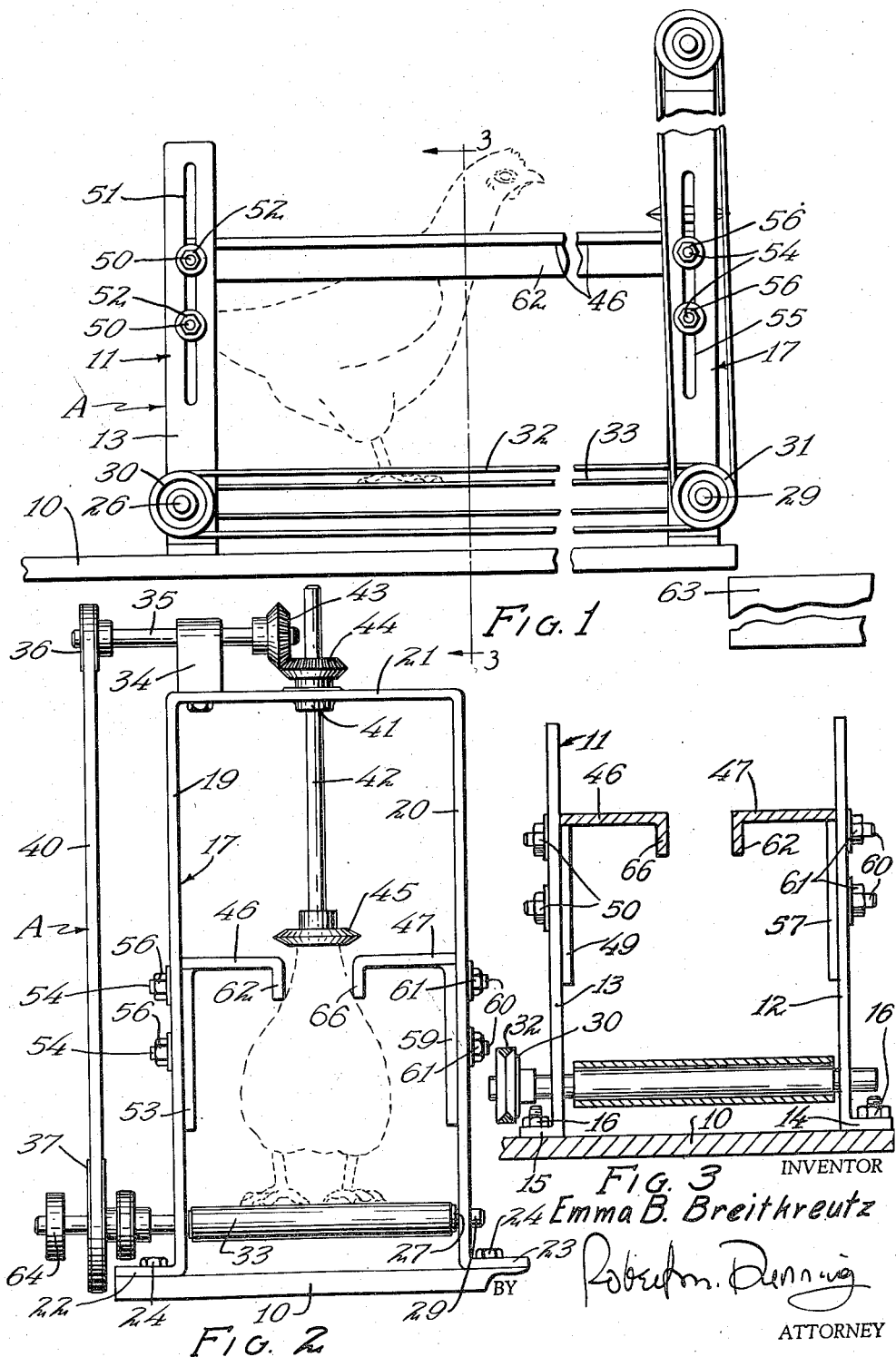

2,952,032

DEVICES FOR KILLING FOWL

Emma B. Breitkreutz, 62 Summit Ave., St. Paul, Minn.

Filed Feb. 17, 1958, Ser. No. 715,732

1 Claim. (Cl. 17—11)

This invention relates to an improvement in devices for killing fowl and deals particularly with an apparatus for severing the neck of the fowl.

The killing of chickens, turkeys, ducks, geese and other domestic fowl is normally a somewhat difficult problem due to the tendency of the fowl to continue movement after the neck of the fowl has been severed. It is accordingly a purpose of the present invention to provide an apparatus for confining the fowl during the killing operation and in moving the fowl while conveyed to a blade which serves to sever the neck of the fowl while still confined.

A feature of the present invention resides in the provision of a framework embodying a movable conveyor upon which the fowl is carried and guide members extending on opposite sides of the neck of the fowl to hold the head of the fowl in a predetermined position as it is conveyed. A rotating knife or similar means is provided in the path of movement of the neck of the fowl and means are provided for rotating the cutting blade as the fowl is conveyed to quickly and neatly cut off the head of the fowl at a predetermined point.

A further feature of the present invention resides in the provision of an apparatus which is adjustable to the size of the fowl being killed so that the same apparatus may be used for small fowl such as chicken and the like and may also be used for larger fowl such as turkeys and other birds of larger size.

These and other objects and novel features of the present invention will be more clearly and fully set forth in the following specification and claim.

In the drawings forming a part of the specification:

Figure 1 is a side elevational view of a portion of a conveyor and confining frame used in conjunction with a fowl killing apparatus.

Figure 2 is an end elevational view of the same.

Figure 3 is a sectional view on line 3—3 of Figure 1.

The apparatus is indicated in general by the letter A. The apparatus includes a base board 10 upon which is mounted a pair of upright frames 11 and 17. The frame 11 includes an upright standard 12 having angularly turned lower extremities 14 and 15 respectively. These flanges 14 and 15 are secured to the base board 10 by bolts 16 or other suitable means. An inverted U-shaped frame member 17 is mounted upon the base board 10 in spaced parallel relation to the frame members 11. The frame member 17 includes a pair of spaced uprights 19 and 20 connected at their upper ends by a connecting member 21. Anchoring flanges 22 and 23 project outwardly from the lower ends of the uprights 19 and 20 and are secured to the base board 10 by means of bolts 24 or similar fastening means.

A transversely extending conveyor roller 25 is supported upon a transverse shaft 26 extending through the frame members 12 and 13 near the lower end thereof. A similar conveyor roller 27 is supported between the uprights 19 and 20 of the frame member 17 on the same horizontal plane as the roller 25. The roller 27 is mounted upon a transverse shaft 29 which extends through the frame sides 19 and 20. Pulleys 30 and 31 are mounted upon the shafts 26 and 29 respectively and are connected by a drive belt 32 so as to operate in unison. A conveyor belt 33 is mounted upon the rollers 25 and 27 and are driven by these rollers in a direction from the frame members 11 toward the frame member 17.

A bearing 34 is mounted upon the cross member 21 of the frame 17 with its axis parallel the axis of the shaft 29. The bearing 34 supports a transverse counter shaft 35 provided with a pulley 36 at one end thereof. The pulley 36 is aligned with a pulley 37 on the shaft 29 and the pulleys 36 and 37 are connected by a belt 40. Preferably, the pulley 37 is of sustantially larger diameter than the pulley 36 so that the shaft 35 will be driven at a greater rate of speed.

A vertical bearing 41 is provided in the cross member 21 near the center thereof and supports a vertical shaft 42. A pair of bevel gears 43 and 44 are arranged in mesh, one gear 43 being on the horizontal shaft 35 and the other gear 44 being on the vertical shaft 42. A cutter wheel 45 is mounted upon the shaft 42. The shaft 42 is vertically adjustable relative to the bevel gear 44 so that the elevation of the cutter wheel 45 may be varied.

A pair of elongated angle brackets 46 and 47 are supported between the sides of the frames 11 and 17. The angle member 46 is provided with rear and forward vertical straps 49 which support outwardly projecting studs 50. The studs 50 extend through a slot 51 in the upright 13 and are equipped with clamping nuts 52. In a similar way, the forward end of the frame 46 is provided with an upright supporting bracket 53 bearing studs 54 which extend through slots 55 and clamping nuts 56 on the studs 54 hold the upright bracket member 53 at a desired elevation.

The angle member 47 is similarly provided with a rear upright 57 and a forward upright 59, both of which are provided with outwardly projecting studs 60 designed to extend through slots in the sides of the frames 11 and 17 and these studs are equipped with clamping nuts 61 designed to hold the frame member 47 at a desired elevation.

The angle members 46 and 47 are provided with spaced flanges 62 and 66 which are spaced apart a distance substantially equal to the thickness of the neck of the bird to be killed. Thus, when the bird is placed upon the conveyor belt 33 and the neck of the bird is confined between the flanges 62, the bird is restrained from movement and is carried by the conveyor belt 33 to the cutting blade 45 which severs the neck of the bird. With the structure illustrated, the vertical adjustment of the angle members 46 and 47 is normally usually only employed when the size of the fowl changes materially such as when killing chickens and turkeys. A receptacle 63 may be provided into which the severed head of the fowl may drop.

A pulley 64 is illustrated on the shaft 29 which may be connected to a suitable source of power supply when the apparatus is electrically operated. Obviously, the conveyor and cutter knife may also be operated manually.

In accordance with the patent statutes, I have described the principles of construction and operation of my improvement in devices for killing fowl, and while I have endeavored to set forth the best embodiments thereof, I desire to have it understood that changes may be made within the scope of the following claim without departing from the spirit of my invention.

I claim:

A fowl killing apparatus including a movable belt conveyor adapted to serve as a fowl supporting platform, a base, two pairs of spaced uprights supported by said base, rollers supported between the uprights of each pair, said conveyor being supported by said rollers, a pair of opposed neck confining members supported by said uprights and extending generally parallel to said conveyor, a cross member connecting the uprights of one of said pairs above said neck confining members, a vertical shaft supported by said cross member, a rotary knife on said shaft above said neck confining members and extending across the space therebetween and means for driving said conveyor and shaft in unison.

References Cited in the file of this patent

UNITED STATES PATENTS

| | | |
|---|---|---|
| 2,152,082 | Onorato et al. | Mar. 28, 1939 |
| 2,184,889 | Schneider | Dec. 26, 1939 |
| 2,306,773 | Biffinger | Dec. 29, 1942 |
| 2,750,977 | Vella et al. | June 19, 1956 |
| 2,794,209 | Self | June 4, 1957 |
| 2,837,131 | Fried | June 3, 1958 |